United States Patent
Bergström et al.

(10) Patent No.: US 10,342,055 B2
(45) Date of Patent: Jul. 2, 2019

(54) REPORTING WIRELESS LOCAL-AREA NETWORK TERMINAL CONNECTIONS TO 3GPP NODES

(71) Applicant: Telefonaktiebolaget L M Ericsson (publ), Stockholm (SE)

(72) Inventors: Mattias Tan Bergström, Stockholm (SE); Icaro L. J. da Silva, Bromma (SE); Oumer Teyeb, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 130 days.

(21) Appl. No.: 14/899,013

(22) PCT Filed: Sep. 24, 2015

(86) PCT No.: PCT/SE2015/051001
§ 371 (c)(1),
(2) Date: Dec. 16, 2015

(87) PCT Pub. No.: WO2016/048224
PCT Pub. Date: Mar. 31, 2016

(65) Prior Publication Data
US 2016/0302245 A1   Oct. 13, 2016

Related U.S. Application Data

(60) Provisional application No. 62/056,037, filed on Sep. 26, 2014.

(51) Int. Cl.
*H04W 48/16* (2009.01)
*H04W 76/14* (2018.01)
(Continued)

(52) U.S. Cl.
CPC .......... *H04W 76/14* (2018.02); *H04W 24/10* (2013.01); *H04W 28/08* (2013.01); *H04W 36/22* (2013.01);
(Continued)

(58) Field of Classification Search
None
See application file for complete search history.

(56) References Cited

U.S. PATENT DOCUMENTS 9,860,872 B2    1/2018   Himayat et al.
2007/0183383 A1* 8/2007  Bitran .................. H04W 88/06
                                                           370/338
(Continued)

FOREIGN PATENT DOCUMENTS

WO    2013155916 A1   10/2013
WO    2014043500 A1    3/2014
(Continued)

OTHER PUBLICATIONS

3GPP, "3rd Generation Partnership Project; Technical Specification Group Core Network and Terminals; Access Network Discovery and Selection Function (ANDSF) Management Object (MO) (Release 12)", 3GPP TS 24.312 V12.7.0, Dec. 2014, 1-371.
(Continued)

*Primary Examiner* — Brandon M Renner
(74) *Attorney, Agent, or Firm* — Murphy, Bilak & Homiller, PLLC

(57) ABSTRACT

A wireless local area network, WLAN, node determines (1120) whether one or more wireless terminals have connected to the WLAN and reports (1130) to a node in a wide-area cellular network, such as a 3GPP network, whether one or more terminals have connected to the WLAN. This report may be triggered, for example, when a terminal has connected to the WLA, or by the completion of a connection procedure, successfully or unsuccessfully, by one or a predetermined number of wireless terminals. Conditional reporting can be used to reduce the amount of signaling between the WLAN AP and the 3GPP network.

6 Claims, 9 Drawing Sheets

(51) Int. Cl.
| | |
|---|---|
| H04W 76/18 | (2018.01) |
| H04W 76/30 | (2018.01) |
| H04W 76/11 | (2018.01) |
| H04W 28/08 | (2009.01) |
| H04W 36/22 | (2009.01) |
| H04W 24/10 | (2009.01) |
| H04W 48/18 | (2009.01) |
| H04W 84/04 | (2009.01) |
| H04W 84/12 | (2009.01) |
| H04W 92/02 | (2009.01) |

(52) U.S. Cl.
CPC ............ *H04W 76/11* (2018.02); *H04W 76/18* (2018.02); *H04W 76/30* (2018.02); *H04W 48/18* (2013.01); *H04W 84/042* (2013.01); *H04W 84/12* (2013.01); *H04W 92/02* (2013.01)

(56) References Cited

U.S. PATENT DOCUMENTS

| | | | |
|---|---|---|---|
| 2014/0064068 A1 | 3/2014 | Horn et al. | |
| 2014/0079022 A1 | 3/2014 | Wang et al. | |
| 2015/0092553 A1* | 4/2015 | Sirotkin | H04W 48/16 370/235 |
| 2015/0092688 A1* | 4/2015 | Jeong | H04W 8/26 370/329 |
| 2015/0103648 A1* | 4/2015 | Chou | H04W 72/042 370/230 |
| 2015/0271729 A1* | 9/2015 | Sirotkin | H04W 48/00 370/332 |
| 2015/0341821 A1* | 11/2015 | Hong | H04W 28/08 370/230 |
| 2016/0007268 A1* | 1/2016 | Jung | H04W 48/08 370/338 |
| 2016/0112921 A1* | 4/2016 | Nagasaka | H04W 36/22 370/331 |
| 2016/0255571 A1* | 9/2016 | Yan | H04W 48/16 455/434 |
| 2017/0048914 A1* | 2/2017 | Zeng | H04W 28/08 |
| 2017/0070923 A1* | 3/2017 | Li | H04W 36/0066 |
| 2017/0150398 A1* | 5/2017 | Laselva | H04W 28/08 |

FOREIGN PATENT DOCUMENTS

| | | |
|---|---|---|
| WO | 2014067565 A1 | 5/2014 |
| WO | 2014084792 A1 | 6/2014 |
| WO | 2014110777 A1 | 7/2014 |
| WO | 2014111808 A2 | 7/2014 |
| WO | 2014148860 A1 | 9/2014 |
| WO | 2014165832 A1 | 10/2014 |
| WO | 2014182611 A1 | 11/2014 |
| WO | 2015020586 A1 | 2/2015 |
| WO | 2015023449 A2 | 2/2015 |
| WO | 2015024598 A1 | 2/2015 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.3.0, Sep. 2012, 1-205.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.2.0, Jun. 2014, 1-215.

3GPP, "3rd Generation Partnership Project; Technical Specification Group Radio Access Network; Evolved Universal Terrestrial Radio Access (E-UTRA); User Equipment (UE) procedures in idle mode (Release 12)", 3GPP TS 36.304 V12.3.0, Dec. 2014, 1-37.

3GPP, "3rd Generation Partnership Project; Technical Specification Group Radio Access Network; Evolved Universal Terrestrial Radio Access (E-UTRA); User Equipment (UE) procedures in idle mode (Release 12)", 3GPP TS 36.304 V12.2.0, Sep. 2014, 1-37.

3GPP, "3rd Generation Partnership Project; Technical Specification Group Radio Access Network; Study on Multi-RAT joint coordination (Release 13)", 3GPP TR 37.870 V0.2.0, May 2014, 1-15.

3GPP, "3rd Generation Partnership Project; Technical Specification Group Radio Access Network; Study on Wireless Local Area Network (WLAN)—3GPP radio interworking (Release 12)", 3GPP TR 37.834 V12.0.0, Dec. 2013, 1-17.

3GPP, "3rd Generation Partnership Project; Technical Specification Group Services and System Aspects; Architecture enhancements for non-3GPP accesses (Release 11)", 3GPP TS 23.402 V11.4.0, Sep. 2012, 1-252.

Rigney, C. et al., "Remote Authentication Dial in User Service (RADIUS)", Network Working Group, Request for Comments: 2865, Jun. 2000, 1-77.

Unknown, Author, "3GPP-WLAN Coordination Scenario and parameters usage", Catt et al., 3GPP TSG RAN WG3 Meeting #87, R3-150222, Athens, Greece, Feb. 9-13, 2015, 1.

Unknown, Author, "LTE/UMTS/WLAN load balancing", Intel Corporation, 3GPP TSG-RAN3 Meeting #85bis, R2-142399, Shanghai, China, Oct. 6-10, 2014, 1-2.

Unknown, Author, "PTID based UE identity correlation between 3GPP RAN and WT", Nokia Networks, 3GPP TSG-RAN WG3 Meeting #87bis, R3-150773, Santa Cruz, Spain, Apr. 20-24, 2015, 1-3.

Unknown, Author, "Use Case for enhancement of 3GPP-WLAN traffic steering", Nokia Networks, CMCC, 3GPP TSG-RAN WG3 Meeting #87, R3-150183, Athens,.Greece, Feb. 9-13, 2015, 1-3.

Unknown, Author, "Way forward on Multi-RAT Joint coordination", 3GPP TSG-RAN3 Meeting #84, R3-141512, Seoul, Korea, May 19-23, 2014, 1-3.

Unknown, Author, "WLAN-eNB Traffic Offload Considerations", Ericsson, 3GPP TSG-RAN WG3 #87, R3-150323, Athens, Greece, Feb. 9-13, 2015, 1-3.

Unknown, Author, "3rd Generation Partnership Project; Technical Specification Group Radio Access Network; Evolved Universal Terrestrial Radio Access Network (E-UTRAN); X2 application protocol (X2AP) (Release 12)", 3GPP TS 36.423 V12.3.0, Sep. 2014, 1-153.

Unknown, Author, "WLAN-eNB Load Reporting", Ericsson, 3GPP TSG-RAN WG3 #85bis, R3-142442, Shanghai, China, Oct. 6-10, 2014, 1-3.

3GPP, "3rd Generation Partnership Project; Technical Specification Group Core Network and Terminals; Access Network Discovery and Selection Function (ANDSF) Management Object (MO) (Release 12)", 3GPP TS 24.312 V12.6.0, Sep. 2014, 1-354.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.3.0, Sep. 2014, 1-215.

3GPP, "3rd Generation Partnership Project; Technical Specification Group Services and System Aspects; Architecture enhancements for non-3GPP accesses (Release 12)", 3GPP TS 23.402 V12.6.0, Sep. 2014, 1-288.

Unknown, Author, "3GPP-WLAN Coordination Scenarios", Ericsson, 3GPP TSG-RAN WG3 #85, R3-141884, Dresden, Germany, Aug. 18-22, 2014, 1-4.

Unknown, Author, "Parameters Exchanged from the WLAN to the eNB", Ericsson, 3GPP TSG-RAN WG3 #85, R3-142023, Dresden, Germany, Aug. 18-22, 2014, 1-2.

3GPP, "3rd Generation Partnership Project; Technical Specification Group Radio Access Network; Study on WLAN/3GPP Radio Interworking (Release 12)", 3GPP TR 37.834 V0.4.0, Aug. 2013, 1-14.

* cited by examiner

REPORTING WIRELESS LOCAL-AREA NETWORK TERMINAL CONNECTIONS TO 3GPP NODES

TECHNICAL FIELD

The technology disclosed herein relates generally to wireless communication networks, and more particularly relates to techniques for sharing information between wireless local-area networks and cellular networks to improve traffic offloading.

BACKGROUND

The Evolved UMTS Terrestrial Radio Access Network (E-UTRAN), standardized by members of the $3^{rd}$ Generation Partnership Project (3GPP), includes base stations called enhanced NodeBs (eNBs or eNodeBs), providing the E-UTRA user plane and control plane protocol terminations towards the UE. The eNBs are interconnected with each other using the X2 interface. The eNBs are also connected using the S1 interface to the EPC (Evolved Packet Core), more specifically to the MME (Mobility Management Entity) by means of the S1-MME interface and to the Serving Gateway (S-GW) by means of the S1-U interface. The S1 interface supports many-to-many relation between MMEs/S-GWs and eNBs. A simplified view of the E-UTRAN architecture is provided by FIGS. 1 and 2.

The eNB 110 hosts functionalities such as Radio Resource Management (RRM), radio bearer control, admission control, header compression of user plane data towards serving gateway, and/or routing of user plane data towards the serving gateway. The MME 120 is the control node that processes the signaling between the UE and the CN (core network). Significant functions of the MME 120 are related to connection management and bearer management, which are handled via Non Access Stratum (NAS) protocols. The S-GW 130 is the anchor point for UE mobility, and also includes other functionalities such as temporary DL (down link) data buffering while the UE is being paged, packet routing and forwarding to the right eNB, and/or gathering of information for charging and lawful interception. The PDN Gateway 140 (P-GW, not shown in FIG. 1) is the node responsible for UE IP address allocation, as well as Quality of Service (QoS) enforcement (as further discussed below). The reader is referred to 3GPP TS 36.300 and the references therein for further details of functionalities of the different nodes.

FIG. 2 gives a summary of the functionalities of the different nodes. The reader is referred to the 3GPP document "Evolved Universal Terrestrial Radio Access (E-UTRA) and Evolved Universal Terrestrial Radio Access Network (E-UTRAN); Overall Description; Stage 2," 3GPP TS 36.300, v. 11.3.0 (September 2012), available at www.3gpp.org, and the references therein for the details of the functionalities of the different nodes. In FIG. 2, the boxes labeled eNB 110, MME 120, S-GW 130, and P-GW 140 depict the logical nodes, which may correspond to separate and distinct physical units, in some cases. The smaller boxes within the larger boxes depict the functional entities of the control plane. The shaded boxes within the box labeled eNB 110 depict the radio protocol layers.

The wireless local-area network (WLAN) technology known as "Wi-Fi" has been standardized by IEEE in the 802.11 series of specifications (i.e., as "IEEE Standard for Information technology-Telecommunications and information exchange between systems. Local and metropolitan area networks-Specific requirements. Part 11: Wireless LAN Medium Access Control (MAC) and Physical Layer (PHY) Specifications").

Using Wi-Fi/WLAN (the two terms are used interchangeably throughout this document) to offload traffic from the mobile networks is becoming more and more interesting from both the operators' and end users' points of view. Reasons for this include the additional frequency that may be obtained—by using Wi-Fi, operators can access an additional 85 MHz of radio bandwidth in the 2.4 GHz band and nearly another 500 MHz in the 5 GHz band. Cost is another factor, as Wi-Fi uses unlicensed frequency that is free of charge. On top of that, the cost of a typical Wi-Fi Access Points (AP), from both capital expense (CAPEX) and operational expense (OPEX) perspectives, is considerably lower than that of a 3GPP base station (BS/eNB).

In addition, operators can take advantage of already deployed APs that are already deployed in hotspots such as train stations, airports, stadiums, shopping malls, etc. Further, most end users are also currently accustomed to having Wi-Fi for "free" at home (as home broadband subscriptions are usually flat rate) and at many public places. Another factor is the high data rates that are increasingly demanded by customers. Under low interference conditions and assuming the user is close to the Wi-Fi AP, Wi-Fi can provide peak data rates that outshine that of current mobile networks (for example, theoretically up to 600 Mbps for IEEE 802.11n deployments with MIMO (Multiple Input Multiple Output)).

Still another factor in this increased interest in Wi-Fi integration, or at least in closer cooperation between WLANs and cellular networks, is the rapidly increasing support for Wi-Fi among cellular telephones. Many portable devices currently available in the market, including virtually all smartphones, support Wi-Fi. Note that in the specifications that define the Wi-Fi world, the term "station" (STA) is used instead of UE; because this document is generally considered with devices that support both a cellular technology (such as E-UTRA) and Wi-Fi, the terms UE, STA and terminal are used interchangeably in this document.

A very simplified Wi-Fi architecture is illustrated in FIG. 3 and FIG. 4, below. On the user plane, illustrated in FIG. 3, a very lean architecture is employed, where the UE/STA is connected to the Wi-Fi Access Point (AP). The Wi-Fi in turn can be directly connected to the Internet, thus providing the UE/STA access to application servers on the Internet. In the control plane, as illustrated in FIG. 4, an Access point Controller (AC) may handle the management of the AP. One AC usually handles the management of several APs. Security/authentication of users can be handled via an Authentication, Authorization and Accounting (AAA) entity, which is shown as a RADIUS server in FIG. 4. Remote Administration Dial-In User Service (RADIUS) is the most widely used network protocol for providing a centralized AAA management (RFC 2865).

The Access Network Discovery and Selection Function (ANDFS) is an entity defined by 3GPP for providing access discovery information as well as mobility and routing policies to the UE. ANDFS is a new entity added to the 3GPP architecture in Release 8 of 3GPP TS 23.402. (See "Architecture Enhancements for non-3GPP Accesses," 3GPP TS 23.402, v. 11.4.0 (September 2012), available at www.3gpp.org.) A simplified ANDSF architecture is depicted in FIG. 5. As shown in the figure, the ANDSF server is connected to the UE, and its main goal is to provide the UE with access network information in a resource efficient and secure manner. The communication between the UE and the ANDSF server is defined as an IP-based interface referred to as the S14 interface.

By supplying information about both available 3GPP and non-3GPP access networks to the UE, the ANDSF enables an energy-efficient mechanism of network discovery, where the UE can avoid continuous and energy-consuming background scanning. Furthermore, ANDSF provides the mobile operators with a tool for the implementation of flexible and efficient UE steering of access mechanisms, where policy control can guide UEs to select one particular RAN over another.

The ANDSF supplies three types of information—discovery information, inter-system mobility policies (ISMP) and inter-system routing policies (ISRP). All these are summarized and implemented via ANDSF managed objects (MO), which are communicated to the UEs via an over-the-top (OTT) signaling channel, as SOAP-XML messages.

The discovery information provides the UE with information regarding the availability of different RATs in the UE's vicinity. This helps the UE to discover available access networks, including 3GPP and non-3GPP access networks, without the burden of continuous background scanning. Inter-System Mobility Policies (ISMP) are policies which guide the UE to select the most preferable 3GPP or non-3GPP access. The ISMP are used for UEs that access a single access network (e.g., 3GPP or Wi-Fi) at a time.

The ISMP information specifies the behavior of UEs that can be connected to only one access network at a given time (either 3GPP, WLAN, WiMAX, etc.). If the UE, however, supports connection to several access networks at the same time, the operator can use the third type of information, ISRP, to increase the granularity of the RAN selection. In that case, the UEs will be provided with policies that specify how the traffic flows should be distributed over the different RAN. For example, voice might be only allowed to be carried over a 3GPP RAN connection, while Internet video streaming and best-effort traffic can be routed via WLAN. The ANDSF provides mobile operators with a tool to determine how the UEs connect to different RANs, and hence allows them to add more flexibility in their traffic planning.

As noted above, because of the proliferation of devices that have both Wi-Fi and 3GPP mobile broadband support, offloading traffic to the Wi-Fi network is becoming very interesting, both from the user's and the operator's perspectives. The main difference between traffic steering to and from Wi-Fi, as compared to steering between 3GPP networks or 3GPP-"friendly" networks such as CDMA2000 networks, is that it is generally the terminal that decides when it shall select a Wi-Fi Access Point (AP), while in wide-area networks it is the network that is in charge of the network access decisions.

For technical and historical reasons, the Wi-Fi deployment scenario is in many cases fundamentally different than the cellular deployment. For this reason, special considerations have to be made when integrating Wi-Fi to 3GPP networks. For example, with currently existing technologies the information regarding a wireless terminal's communication in one wireless network, such as a Wi-Fi, is not readily available in another wireless network. This can be especially problematic if one wireless network is controlling the wireless terminal's communication in the other wireless network. International Patent Application Publication WO 2014/084792 A1 describes a method in a mobile terminal in which the terminal transmits information to a first wireless network of the mobile terminal's connection status with respect to a second wireless network. The techniques described herein thus focus on several aspects of integrating Wi-Fi to 3GPP networks, including the problem addressed by the WO 2014/084792 A1 publication, to realize optimal steering of traffic while considering both the end user's as well as the network's performance.

SUMMARY

In the detailed disclosure that follows, mechanisms between a 3GPP RAN node and a WLAN are defined. Further, mechanisms between a UE and the 3GPP RAN node and/or WLAN are also defined. These mechanisms make it possible for the 3GPP RAN node to determine that terminals associated to it (in connected or idle mode) are connected to WLAN.

A first aspect of the inventive methods and apparatus detailed herein relates to a method implemented in a WLAN node, such as a WLAN AP or other WLAN node. An example method according to this aspect comprises determining whether one or more wireless terminals have connected to the WLAN, and reporting to a node in a wide-area cellular network, such as a 3GPP network, whether one or more terminals have connected to the WLAN. This report may be triggered, for example, when a terminal has connected to the WLAN, or by the completion of a connection procedure, successfully or unsuccessfully, by one or a predetermined number of wireless terminals. Other possible triggers are also detailed below. Further, it is explained how conditional reporting can be used to reduce the amount of signaling between the WLAN AP and the 3GPP network.

A second aspect relates to a method implemented in a node in a wide-area cellular network, such as an eNB in a 3GPP network. An example method according to this second aspect comprises receiving a report from a node in a WLAN, the report indicating whether one or more wireless terminals have connected to the WLAN. The method further comprises taking action with respect to at least one of the wireless terminals, in response to receiving the report. This action may include, for example, releasing a connection between the node and a wireless terminal, or refraining from attempts to offload a wireless terminal to the WLAN.

A third aspect relates to a method in a wireless terminal adapted for operation in a WLAN and in a cellular network. An example method according to this third aspect comprises connecting to a node in the WLAN and sending, to the WLAN, an identifier for a cellular network node with which the wireless terminal is associated or for a cellular network with which the wireless terminal is associated, or both. This identifier may be a 3GPP cell identity, for example, such as an E-CGI.

A fourth aspect relates to an apparatus for use in a WLAN. An example apparatus according to this fourth aspect is adapted to determine whether one or more wireless terminals have connected to the WLAN, and to send a report to a node in a wide-area cellular network, the report indicating whether one or more wireless terminals have connected to the WLAN.

A fifth aspect relates to a cellular network node apparatus for use in a cellular network. An example apparatus according to this fifth aspect is adapted to receive a report from a node in a wireless local-area network, WLAN, the report indicating whether one or more wireless terminals have connected to the WLAN. The example apparatus is further adapted to take action with respect to at least one of the one or more wireless terminals, in response to receiving the report.

A sixth aspect relates to a wireless terminal apparatus adapted for operation in a WLAN and in a cellular network. An example apparatus according to this sixth aspect is adapted to connect to a node in a WLAN and to send, to the WLAN, an identifier for a cellular network node with which the wireless terminal is associated or for a cellular network with which the wireless terminal is associated, or both.

Embodiments of the present invention thus include methods and apparatus as summarized above, as well as corresponding computer program products and computer-readable media. In the detailed description that follows, these embodiments are described in detail.

BRIEF DESCRIPTION OF THE FIGURES

Exemplary embodiments of the techniques introduced in this document are described below with reference to the following figures, in which.

DETAILED DESCRIPTION

Figure 1:
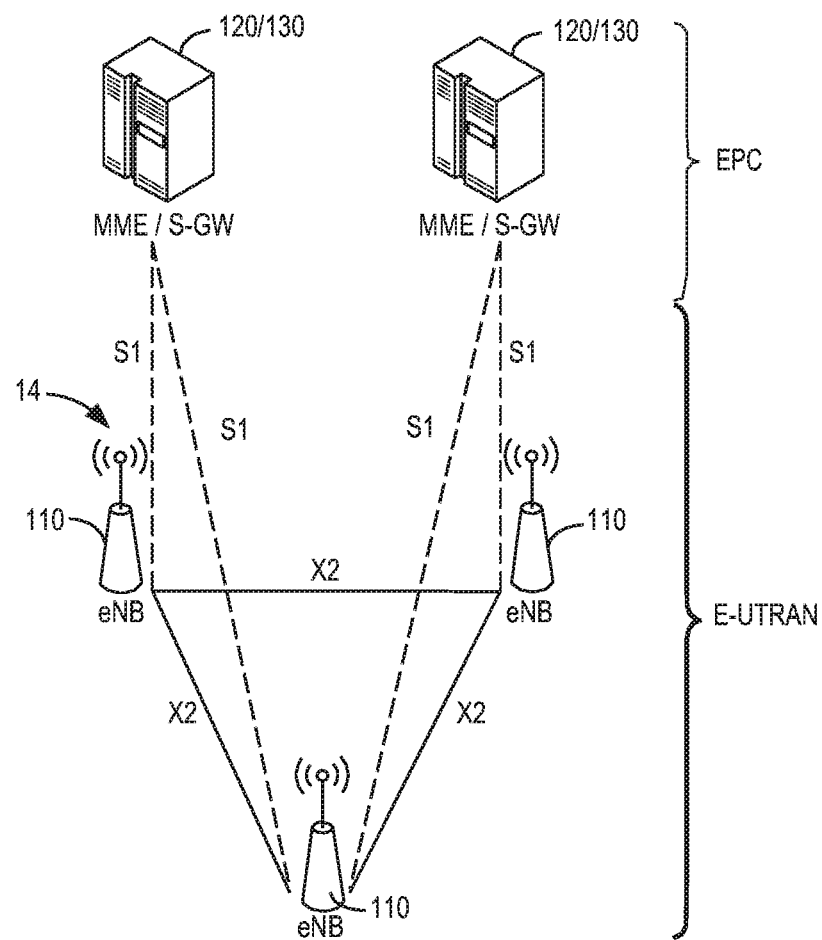
FIG. 1 illustrates the E-UTRA architecture.
Figure 2:
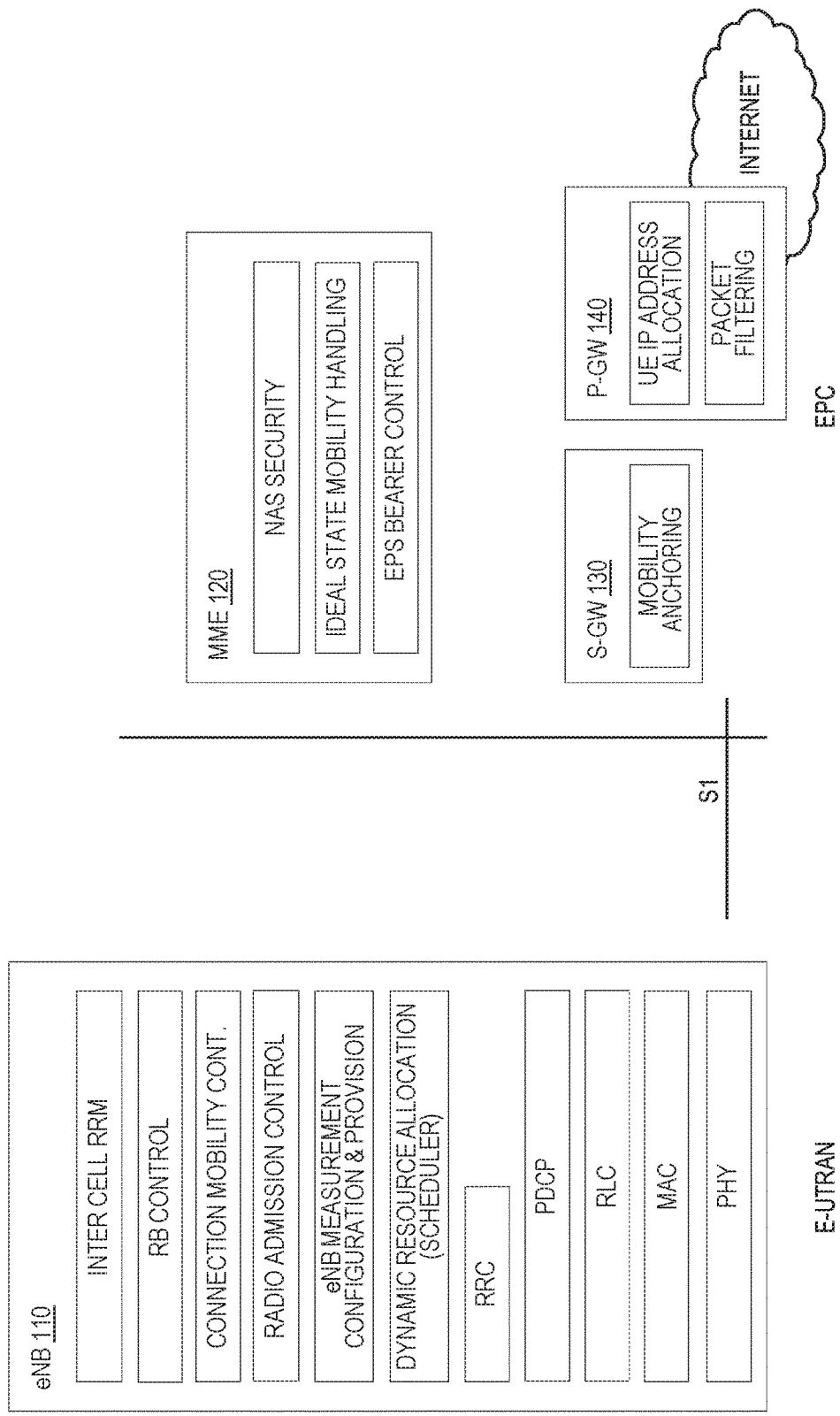
FIG. 2 illustrates the split between the E-UTRAN and the EPC.

Inventive concepts will now be described more fully hereinafter with reference to the accompanying drawings, in which examples of embodiments of inventive concepts are shown. These inventive concepts may, however, be embodied in many different forms and should not be construed as limited to the embodiments set forth herein. Rather, these embodiments are provided so that this disclosure will be thorough and complete, and fully convey the scope of present inventive concepts to those skilled in the art. It should also be noted that these embodiments are not mutually exclusive. Components from one embodiment may be tacitly assumed to be present or used in another embodiment.

As used herein, the terms "mobile terminal," "wireless terminal," "user equipment," or "UE" may be used to refer to any device that receives data from and transmits data to a communication network, any of which may be for example, a mobile telephone ("cellular" telephone), laptop/portable computer, pocket computer, hand-held computer, desktop computer, a machine to machine (M2M) or MTC type device, a sensor with a wireless communication interface, etc. Devices of any of these types may be adapted, according to known techniques and according to the additional techniques disclosed herein, for operation in a device-to-device (D2D) mode, where such operation may include the transmitting and receiving of certain signals that are similar to or identical with corresponding signals used when operating within a cellular network, i.e., in a device-to-base-station operating mode.

A cell in a wide-area cellular network such as the LTE network is associated with a radio access network (RAN) node, where a RAN node comprises in a general sense any node transmitting radio signals in the downlink (DL) to a terminal device and/or receiving radio signals in the uplink (UL) from a terminal device. Some example RAN nodes, or terms used for describing RAN nodes, are base station, eNodeB, eNB, NodeB, macro/micro/pico/femto radio base station, home eNodeB (also known as femto base station), relay, repeater, sensor, transmitting-only radio nodes or receiving-only radio nodes. A RAN node may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band circuitry for different RATs.

It should be noted that unless otherwise indicated, the use of the general term "network node" as used herein refers to a RAN node, such as a base station, an eNodeB, a network node in the RAN responsible for resource management, such as a radio network controller (RNC), a core network node, such as a mobility management entity (MME) or SGW, or a WLAN Access Point (AP) or WLAN access controller (AC).

The signaling described is either via direct links or logical links (e.g. via higher layer protocols and/or via one or more network nodes). For example, signaling from a coordinating node may pass another network node, e.g., a radio node.

Note that although terminology from specifications for the Long-Term Evolution (LTE; also referred to as the Evolved Universal Terrestrial Radio Access Network, or E-UTRAN, is used in this disclosure to exemplify embodiments of the inventive concepts, this should not be seen as limiting the scope of the presently disclosed techniques to only these systems. Devices designed for use in other wireless systems, including variations and successors of 3GPP LTE systems, and WCDMA (UMTS) systems, WiMAX (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of present inventive concepts disclosed herein.

In the discussion that follows, specific details of particular embodiments of the present invention are set forth for purposes of explanation and not limitation. It will be appreciated by those skilled in the art that other embodiments may be employed apart from these specific details. Further, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present invention may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors and/or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 6:
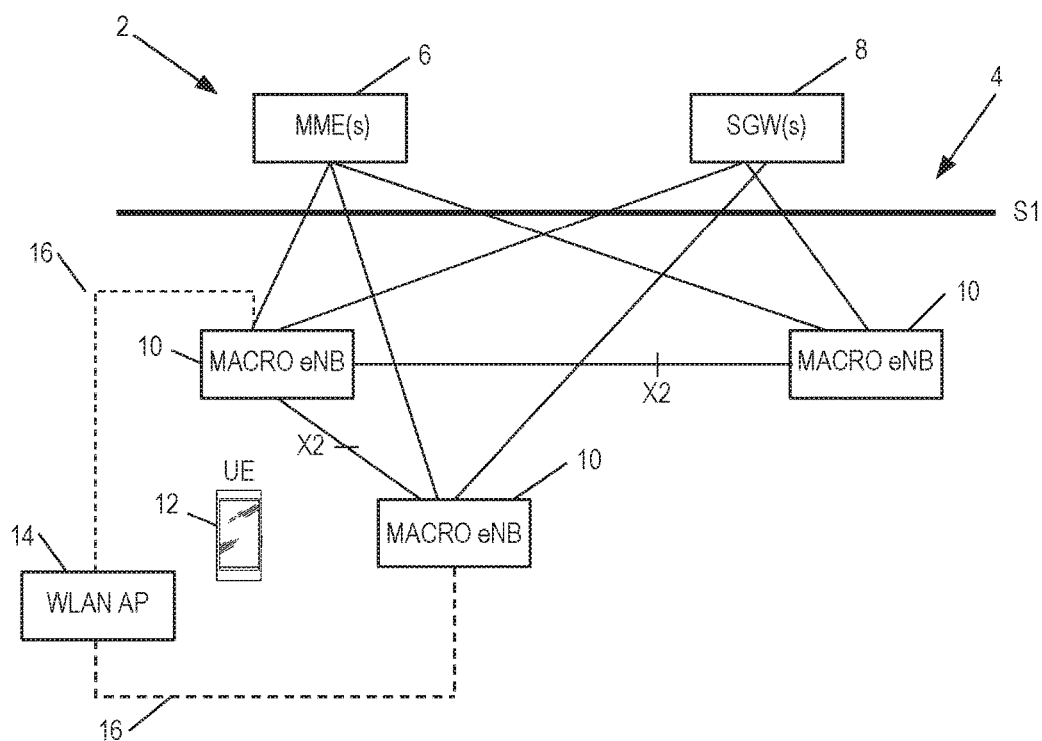
FIG. 6 shows an example of an evolved UMTS Terrestrial Radio Access Network (EUTRAN) architecture as part of an LTE-based communications system.

FIG. 6 shows an example diagram of an evolved UMTS Terrestrial Radio Access Network (EUTRAN) architecture as part of an LTE-based communications system 2. Nodes in the core network 4 include one or more Mobility Management Entities (MMEs) 6, a key control node for the LTE access network, and one or more Serving Gateways (SGWs) 8 which route and forward user data packets while acting as a mobility anchor. They communicate with base stations 10 in the RAN referred to in LTE as eNBs or eNodeBs, over an interface, for example an S1 interface.

The eNBs 10 can include the same or different categories of eNBs, e.g. macro eNBs, and/or micro/pico/femto eNBs. The eNBs 10 communicate with each other over an interface, for example an X2 interface. The S1 interface and X2 interface are defined in the LTE standard. A UE 12 can receive downlink data from and send uplink data to one of the base stations 10 with that base station 10 being referred to as the serving base station of the UE 12. An access point (AP) 14 that is part of a WLAN is also shown in FIG. 6, although it will be appreciated that the WLAN and AP 14 are not part of the EUTRAN architecture. As is known in the art, the UE 12 may be capable of aggregating multiple carriers from a single eNB 10 or multiple eNBs 10, and may, in some embodiments, be capable of aggregating a carrier from the LTE network 2 with a carrier from the WLAN AP 14.

In order to implement some of the various embodiments described herein, a communication path is established between the WLAN AP 14 and at least one of the nodes 10 in the LTE network 2 so that a dedicated connection can be established between the nodes. This is shown in FIG. 6 as interface 16. It will be appreciated that this connection would typically be established via the broadband connection of WLAN AP 14, rather than there being a direct (e.g., air interface) signaling connection between the AP 14 and eNB 10. Similar interfaces may be established between one eNB 10 and multiple WLAN APs 14. It will also be appreciated that where the AP 14 is within the coverage area of several eNBs 10, the AP 14 may have separate interfaces 16 to each of those eNBs 10.

Inter-node interfaces 16 between pairs of nodes 10, 14 may use a peer to peer interface, i.e., an interface that connects the two nodes directly. Alternatively, inter-node interfaces could connect the two nodes while passing through other network nodes.

Figure 7:
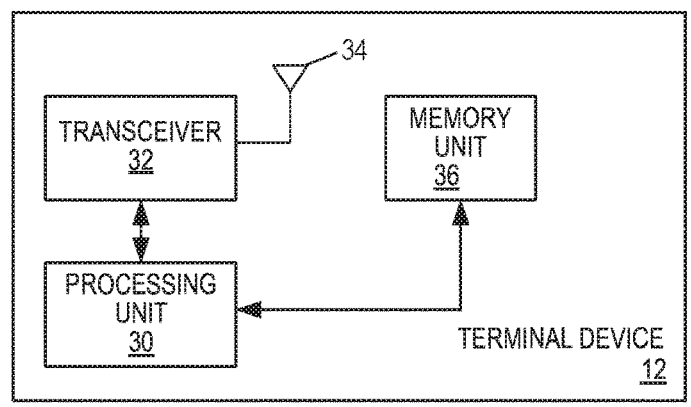
FIG. 7 is a block diagram of a terminal device according to some embodiments of the disclosed techniques.

FIG. 7 shows a terminal device 12 or user equipment (UE) that can be adapted for use in one or more of the example embodiments described herein. The terminal device 12 comprises a processing unit 30 that controls the operation of the terminal device 12. The processing unit 30 is connected to a receiver or a transceiver 32 (which comprises a receiver and a transmitter) with associated antenna(s) 34 which are used to receive signals from or both transmit signals to and receive signals from two different types of radio access network (i.e., two radio access networks that are operating according to different radio access technologies, RATs), such as RAN node 10 in the LTE network 2 and access point (AP) 14 in a WLAN. The terminal device 12 also comprises a memory unit 36 that is connected to the processing unit 30 and that stores computer program code and other information and data required for the operation of the terminal device 12. Together, the processing unit 30 and the memory unit 36 may be referred to as a processing circuit.

Figure 3:
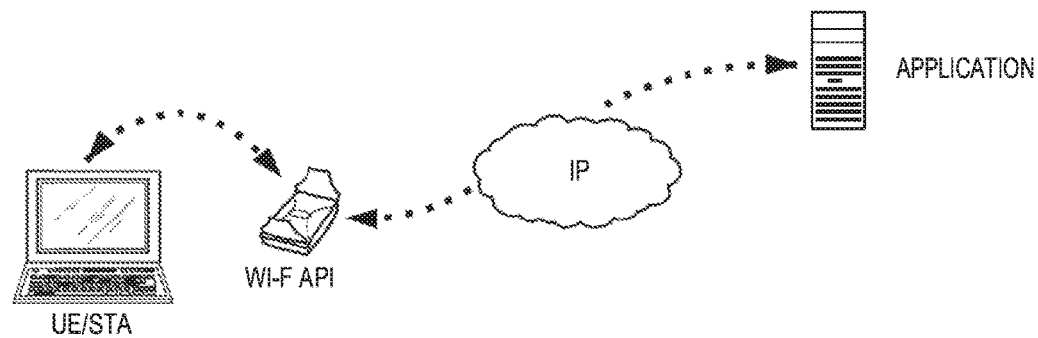
FIG. 3 illustrates a simplified Wi-Fi user plane architecture.
Figure 4:
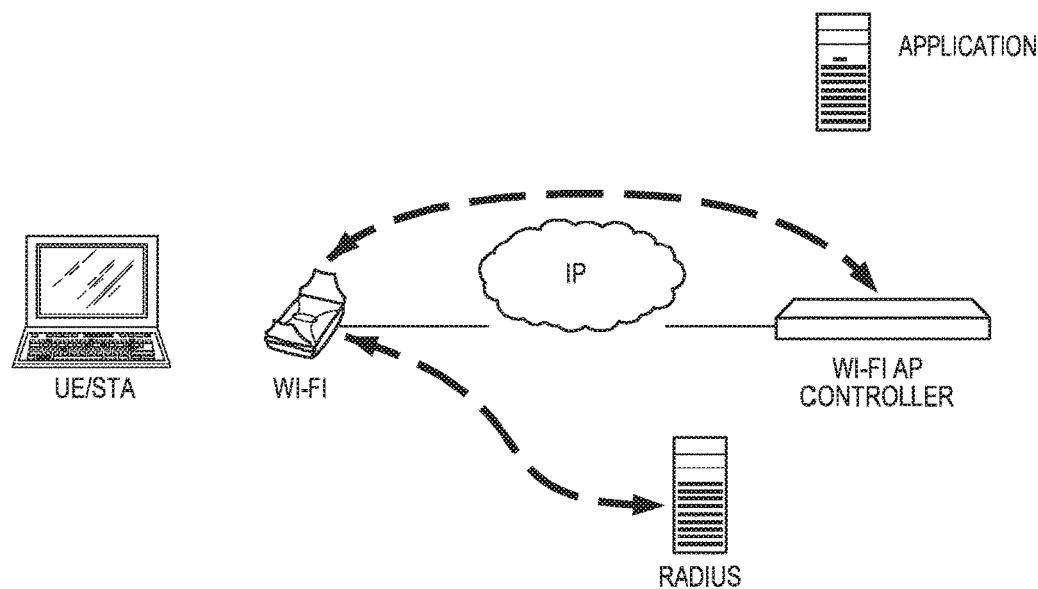
FIG. 4 illustrates a simplified Wi-Fi control plane architecture.
Figure 5:
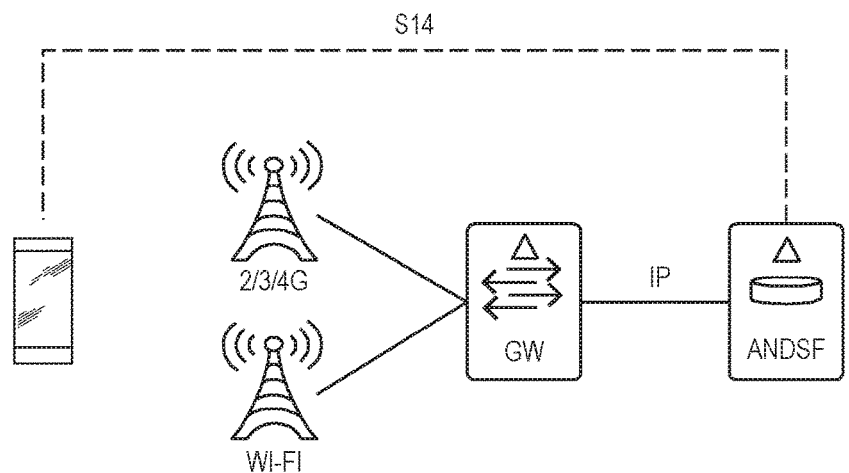
FIG. 5 illustrates the ANDSF architecture.
Figure 8:
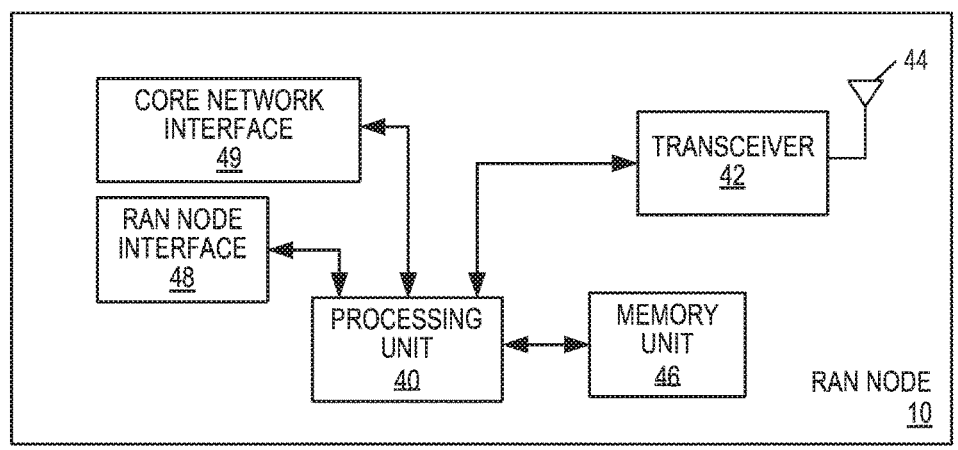
FIG. 8 is a block diagram of a radio access network node according to some embodiments of the disclosed techniques.

FIG. 8 shows a RAN node 10 (for example a base station, NodeB or an eNodeB) that can be adapted for use in several of the example embodiments described herein. The RAN node 10 comprises a processing unit 40 that controls the operation of the base station 10. The processing unit 40 is connected to a transmitter or a transceiver 42 (which comprises a receiver and a transmitter) with associated antenna(s) 44 which are used to transmit signals to, and receive signals from, terminal devices 12 in the network 2. The RAN node 10 also comprises a memory unit 46 that is connected to the processing unit 40 and that stores computer program code and other information and data required for the operation of the RAN node 10. Together, the processing unit 60 and memory unit 66 may be referred to as a processing circuit. The RAN node 10 also includes components and/or circuitry 48 for allowing the RAN node 10 to exchange information with other RAN nodes 10 (for example via an X2 interface) and components and/or circuitry 49 for allowing the RAN node 10 to exchange information with nodes in the core network 4 (for example via the S1 interface). It will be appreciated that RAN nodes for use in other types of network (e.g., a Wideband Code-Division Multiple-Access, WCDMA, RAN) will include similar components to those shown in FIG. 3 and appropriate interface circuitry 48, 49 for enabling communications with the other network nodes in those types of networks (e.g., other base stations, mobility management nodes and/or nodes in the core network).

Figure 9:
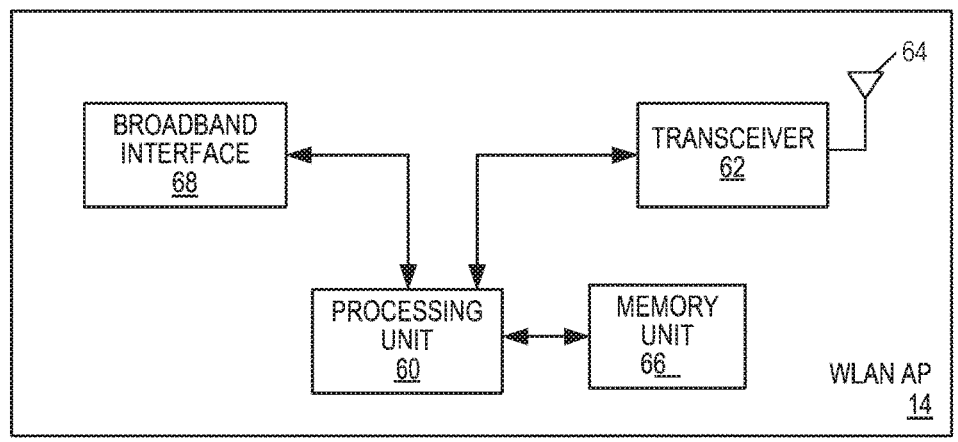
FIG. 9 is a block diagram of a WLAN access point according to some embodiments of the disclosed techniques.

FIG. 9 shows a WLAN AP 14 that can be used in the example embodiments described. The AP 14 comprises a processing unit 60 that controls the operation of the AP 14. The processing unit 60 is connected to a transmitter or a transceiver 62 (which comprises a receiver and a transmitter) with associated antenna(s) 64 which are used to transmit signals to, and receive signals from, terminal devices 12. The AP 14 also comprises a memory unit 66 that is connected to the processing unit 60 and that stores computer program code and other information and data required for the operation of the AP 14. Together, the processing unit 60 and memory unit 66 may be referred to as a processing circuit. The AP 14 also includes components and/or circuitry 68 for connecting the AP 14 to a telephone line or other broadband connection.

It will be appreciated that only the components of the terminal device 12, RAN node 10, and AP 14 required to explain the embodiments presented herein are illustrated in FIGS. 7, 8, and 9.

3GPP is currently specifying mechanisms for access selection and/or traffic steering between 3GPP networks and WLAN. These mechanisms are described in the 3GPP document 3GPP TS 36.300 v12.2.0 (June 2014), which is available at http://www.3gpp.org. More particularly, sections 23.6.1 and 23.6.2 of this 3GPP document provide a simplified description of this mechanism.

A more detailed description of the access network selection and traffic steering rules is provided in section 5.6 of 3GPP TS 36.304, v.12.2.0 (September 2014), also available at http://www.3gpp.org.

With the traffic steering mechanisms described in the above-mentioned 3GPP documents, the 3GPP RAN is influencing, and to some degree controlling, the terminal's access network selection and/or traffic steering decisions between 3GPP and WLAN.

However, the 3GPP Radio Access Network (RAN) has limited information regarding whether a terminal is selecting and/or steering traffic to WLAN. With this limited information, the 3GPP RAN will not be able to take informed Radio Resource Management (RRM) decisions. For example, the 3GPP RAN may not be able to provide suitable thresholds to a wireless terminal due to this lack of knowledge—this can result in poor access selection and/or traffic steering decisions, which may in turn lead to poor user experiences. Further, the 3GPP RAN may not know whether or not the connection between the 3GPP RAN and the wireless terminal can be released or not.

To address these problems, the following detailed discussion defines mechanisms between a 3GPP RAN node (e.g., eNB) and a WLAN, as well as mechanisms between a UE and the 3GPP RAN node and/or WLAN. As demonstrated below, these mechanisms make it possible for the 3GPP RAN node to determine that wireless terminals associated to it (in connected or idle mode) are connected to WLAN.

In several embodiments according to the first mechanisms, a WLAN node (such as the WLAN AP or other WLAN node) reports to the 3GPP network whether one or more wireless terminals have connected to the WLAN. This report may be triggered, for example, when a wireless terminal has connected to the WLAN. Other possible triggers are also detailed below. Further, it is explained how conditional reporting can be used to reduce the amount of signaling between the WLAN AP and the 3GPP network.

In several embodiments according to the second mechanisms, the terminal reports to the WLAN a 3GPP cell identity (e.g., an E-CGI) so that the WLAN can identify which 3GPP RAN node the wireless terminal is associated to. In addition to this, the wireless terminal may reports UE identities to WLAN and/or 3GPP RAN node, so that the 3GPP RAN node is capable of identifying which UE associated to it (in connected mode or recently moved to idle) is transmitting over WLAN.

With these techniques, the 3GPP network node will be given information regarding if and when a wireless terminal is connected to WLAN. This information can be used by the 3GPP network to take more appropriate Radio Resource Management (RRM) decisions, for example, which can result in enhanced system performance and/or user experience, etc. For instance, improved system performance can be achieved by adjusting the handling of wireless terminals, such as by adjusting the parameter settings of the concerned wireless terminal and/or other wireless terminals. It can also be used, for example, to decide whether or not to move the wireless terminal between different states/modes in the 3GPP networks, e.g., when deciding whether or not to move a wireless terminal to IDLE mode.

As noted above, according to current mechanisms, such as those described above, the 3GPP RAN may control/influence when and how a terminal connects to WLAN. However, according to existing implementations, the 3GPP RAN is not aware of whether or not a wireless terminal connects to WLAN and hence does not know whether the offloading to WLAN was successful or not. Without this knowledge, the 3GPP RAN may not be able to set parameters in a suitable way, with the result that future parameter settings will not be optimal and hence will reduce system performance and end user experience. The techniques described herein, among other things, allow the parameter setting process to be improved.

More particularly, according to some embodiments of the presently disclosed techniques, a WLAN Access Point (AP) or other WLAN node reports to a 3GPP RAN node that one or more terminals associated with the 3GPP RAN has connected to the WLAN AP. Whether and/or when the WLAN node shall provide this report to the 3GPP RAN node may be configured by the 3GPP RAN node.

It should be noted that the descriptions that follow and/or the accompanying figures may indicate that a WLAN AP, in particular, is reporting to the 3GPP RAN node. It should be appreciated, however, that it may not be a WLAN AP that performs the reporting in some embodiments or instances. Instead, it may be some other WLAN node, such as a WLAN Access Controller (AC).

The 3GPP RAN node may utilize the information received from the WLAN node in handling the connection between the 3GPP RAN node and the wireless terminal or terminals. For example, the 3GPP RAN node may release the connection between the 3GPP RAN and a wireless terminal if it has been indicated to the 3GPP RAN node that the wireless terminal has successfully connected to a WLAN AP.

It will be appreciated that being "connected" to the WLAN can mean any of several different things, as exemplified by the existence of one or more of the below conditions:

802.11 authentication (Authentication to the WLAN AP) has been completed or is under way;

802.1x EAP-SIM authentication (Authentication to the AAA-servers) has been completed or is under way;

a four-way hand-shake between the wireless terminal and the WLAN has been completed;

an IP address has been assigned to the wireless terminal in WLAN;

a Public Data Network (PDN) connection has been established through the WLAN, i.e., a connection between the wireless terminal and the PDN gateway has been established;

Data traffic has been started through the WLAN.

The WLAN AP may report to the 3GPP RAN node that a wireless terminal has connected to it based on certain triggers. Below, a set of example triggers are described. Note that one or several of the below triggers may be applied, in various embodiments or instances.

1. Connection Procedure Completion

According to this trigger the WLAN AP will trigger a report when a wireless terminal has completed a connection procedure. The WLAN AP may send a report to the 3GPP RAN node upon successfully completed connection procedures. This means, for example, that a wireless terminal has completed one or more of the connection procedures described in the list provided above. It is beneficial for the 3GPP RAN node to know that a wireless terminal has successfully completed WLAN connection, since this may indicate that the wireless terminal now can be served by the WLAN AP and that the 3GPP RAN node can release the connection to the wireless terminal, freeing up resources in the 3GPP RAN node.

In some embodiments or instances, unsuccessfully completed connection procedures are reported. A WLAN AP may, for any of many different reasons, reject a wireless terminal's connection attempt, e.g., because the load on the WLAN AP is too high. That a wireless terminal has tried to connect, but failed, may also be useful information to the 3GPP RAN node. For example, if a certain WLAN AP is rejecting a wireless terminal, the 3GPP RAN node may refrain from attempting any offloading of other wireless terminals to that WLAN AP for a certain period of time, under the assumption that the other terminals would also get rejected. By avoiding further offloading attempts, additional network signaling, terminal power consumption, etc., can be avoided.

2. Request Received from 3GPP Node

The 3GPP RAN node may query the WLAN AP whether one or more wireless terminals have connected to the WLAN AP by sending a request to the WLAN AP. The request may be a general request regarding whether any terminal has connected to the WLAN AP, e.g., during the last time T.

The time T need not be explicitly indicated in the request, although it may be, in some embodiments, but may instead be calculated since the last query occurrence. For example, if the 3GPP RAN node queried the WLAN AP at time T1 and at time T2, the WLAN AP in some embodiments would, in response to the query at time T2, indicate those terminals which have connected between time T1 and time T2. This approach ensures that when the 3GPP RAN node queries a WLAN AP it will receive indications of all wireless terminals that have connected since the last query, thus ensuring that the 3GPP RAN node has complete information about connections to the WLAN AP. Of course, at the first query received from a particular RAN node, there would not exist a time T1; for this case the WLAN AP may apply a default time T1, e.g., T1 is set to be T2−Tdef where Tdef is set to a fixed value, which may be specified in a specification, provided by the 3GPP RAN node, decided by the WLAN AP, etc.

In some embodiments, the 3GPP RAN node includes the time T in the query request, which allows the 3GPP RAN node to decide how far back in time it is interested to know about completed connections. For example, if the 3GPP RAN node tried to offload a terminal to a WLAN at a time T3, the 3GPP RAN node may be interested in whether that particular terminal is connected to the WLAN but may not be interested in whether terminals have connected to the WLAN prior to the time T3; hence, the 3GPP RAN node may query the WLAN AP to determine whether any terminals have connected to the WLAN AP since time T3. This allows for reducing the amount of signaling between the WLAN and the 3GPP RAN node, as connection attempts which have occurred prior to T3 can be omitted, reducing signaling overhead.

3. Periodic Reporting

In some embodiments, the WLAN may periodically report to the 3GPP RAN node whether wireless terminals have connected to the WLAN. The WLAN AP may maintain a timer T, for example, and when this timer T expires the WLAN AP triggers a report to the 3GPP RAN node and restarts the timer.

The timer value may be determined by the WLAN AP itself. However, the timer value may be configured by the 3GPP RAN node, in some embodiments. In these embodiments, the 3GPP RAN node can evaluate how often the information is needed, e.g., once per ten seconds, and then configure the WLAN AP to send a report to the 3GPP RAN node with the wanted periodicity.

Periodic reporting is a simple approach that does not require a lot of signaling (e.g., compared to the request-based triggering, which requires the 3GPP node to request the reports), while at the same time keeping the 3GPP RAN node up-to-date with information about whether terminals have connected to the WLAN AP.

4. Number of Connected UEs

In some embodiments, the WLAN may report to the 3GPP RAN node when the number of terminals connecting to it has passed a certain configurable threshold since the last reporting. For example, if this threshold is set to be five, the WLAN will report when five terminals have connected to it since the last reporting.

In some embodiments, one or more conditions may need to be fulfilled before the WLAN AP will include a particular terminal in the report. A set of example conditions are provided below.

1. Wireless Terminal Support for 3GPP

Not all devices support 3GPP connectivity. For example, smartphones usually support both 3GPP RATs and WLAN while, for example, certain tablet devices may only support WLAN. It may not be meaningful for the report to include information indicating that a non-3GPP device has completed a connection attempt, when the WLAN node informs the 3GPP RAN node about connection attempts.

Hence, the WLAN AP in some embodiments may consider a wireless terminal's 3GPP connection capability when deciding whether to include it in the report. The WLAN AP may, in these embodiments, only include information regarding wireless terminals that are known to support 3GPP connectivity. This information may be made known to the WLAN node from the wireless terminal, i.e., the wireless terminal would indicate to the reporting WLAN node (or another WLAN node that can then inform the reporting WLAN node) whether it supports 3GPP connectivity or not. Alternatively, this could be inferred from other information such as UE identity that can be mapped to a device/terminal type.

2. 3GPP Network Connection Status

The WLAN AP (or other WLAN node) may consider a wireless terminal's connection status to the 3GPP network when determining whether to include the wireless terminal in the report. For example, if the wireless terminal has an active connection to the 3GPP network (e.g., RRC CONNECTED in LTE, CELL_DCH/CELL_FACH/CELL_PCH in UMTS, etc.), the 3GPP network can control the wireless terminal using dedicated signaling. In those situations, then, it may be more meaningful for the 3GPP RAN to be aware that a particular wireless terminal has connected to WLAN. On the other hand, if the wireless terminal is in an IDLE state, then no dedicated signaling is supported in 3GPP and the 3GPP RAN is not aware of the wireless terminal's presence in the 3GPP cell. Hence, it may be less meaningful for the 3GPP RAN to be informed about those wireless terminals that are in an IDLE state and that have connected to WLAN, compared to wireless terminals that have an active connection to the 3GPP network.

Accordingly, the WLAN AP in some embodiments may only indicate to the 3GPP RAN node when a wireless terminal in a 3GPP connected state has connected to the WLAN AP, but not include information about a wireless terminal in an IDLE state in the report.

This can be achieved, for example, if the wireless terminal provides to the WLAN AP an indication of the 3GPP network identity (such as the 3GPP cell ID) selectively, depending on which state the wireless terminal is in. For instance, the wireless terminal in some embodiments may only indicate to the WLAN AP the 3GPP network identity if the wireless terminal is in a connected state but not when in an IDLE state. In this case, the WLAN AP can implicitly know which state the wireless terminal is in depending on whether the wireless terminal indicates the 3GPP network identity. It would also be possible that the wireless terminal explicitly indicates its 3GPP state to the WLAN AP and then the WLAN AP will explicitly know the state of the wireless terminal in the 3GPP domain.

3. Request from a Wireless Terminal

In some embodiments, a wireless terminal may request the WLAN to indicate to the 3GPP RAN node that the wireless terminal has connected to the WLAN. The wireless terminal may indicate this to the WLAN node during the connection to the WLAN node.

The wireless terminal may determine whether to request the WLAN to include it in the report based on its configuration as established by signaling from the 3GPP network. In this case, the 3GPP network can then decide whether the wireless terminal shall or shall not request the WLAN network to include it in the report. The knowledge of the 3GPP network identity such as cell/eNB ID will be useful to determine to what particular node the report has to be sent.

4. PLMN

The WLAN AP may, in some embodiments or instances, only include a wireless terminal in the report if the PLMN (or one of several PLMNs) that the wireless terminal is associated with or connected to is the same as for the 3GPP RAN node the report is sent to.

The wireless terminal may indicate to the WLAN AP the PLMN(s) that the wireless terminal is associated with or connected to during the connection procedure with the WLAN, for example. The WLAN AP may know the PLMN(s) of a 3GPP RAN node base on configuration or by indication of the 3GPP RAN node.

The benefit of only including in the report information about wireless terminals from the PLMN that the 3GPP RAN node belongs to is that the 3GPP network node does not necessarily need to know that wireless terminals from another PLMN have connected to the WLAN. For example, if an operator X owns a 3GPP RAN X and an operator Y owns a 3GPP RAN Y, then the 3GPP RAN X may only be interested about whether terminals belonging to operator X are connecting to a WLAN AP, and not being interested in whether terminals belonging to operator Y are connecting to the WLAN AP.

5. Cause of WLAN Connection

In some embodiments, a WLAN AP may consider the cause for a wireless terminal connecting to the WLAN when determining whether to include the wireless terminal in the report. This may be beneficial, as the wireless terminal may connect to a WLAN AP for any of several different reasons. One reason where it is interesting for the RAN to know whether a wireless terminal connected to a WLAN is when the wireless terminal connected to the WLAN due to a RAN controlled/influenced mechanism (e.g., due to an offloading mechanism as described in the background section). In contrast, if the wireless terminal connected to the WLAN AP based on user preference (i.e., the end user forced/requested the wireless terminal to connect to the WLAN AP), then the 3GPP RAN may not be interested in knowing that the wireless terminal has connected, since the 3GPP RAN was not the trigger for the terminal's connection to the WLAN AP.

To enable this trigger the WLAN AP needs to know the cause of the connection to the WLAN AP. This may be achieved by the wireless terminal providing an indication to the WLAN AP during or after the connection procedure. It may also be possible that the WLAN AP implicitly knows the cause by the type of connection the wireless terminal is establishing in the WLAN domain. For example, if the terminal is establishing an S2a/S2b/S2c connection through the WLAN then the WLAN AP may be able to assume that the wireless terminal is connecting to the WLAN AP due to an operator-controlled/influenced (i.e., RAN-controlled/influenced) mechanism. Further, the wireless terminal may be configured to indicate to the WLAN AP (either directly or via another node such as the WLAN AC) the 3GPP RAN node identity if the wireless terminal connects to a WLAN based on an operator controlled/influenced mechanism, but be configured to not provide such indication when the wireless terminal connects to the WLAN AP due to, e.g., an end-user trigger. The WLAN AP can then implicitly know that if the 3GPP RAN node identity is provided, the wireless terminal has connected due to an operator controlled/influenced mechanism. Any of several possible information elements may be included in the report sent by the WLAN node to the 3GPP node. Following are a list of examples.

1. Wireless Terminal Identity

In some embodiments, the WLAN AP may inform the 3GPP RAN of an identity for the wireless terminal. This may allow the 3GPP RAN to know not only that a wireless terminal has connected to WLAN but also which wireless terminal has connected. Possible identities include 3GPP C-RNTI, IMSI, WLAN MAC, IP address, an identifier common for the terminals 3GPP and WLAN entity.

A generic identity may also or instead be included in the report. This identity may be provided by the 3GPP RAN node, e.g., the 3GPP RAN node has indicated the generic identity to the wireless terminal and the wireless terminal indicates this to the WLAN AP (e.g., during the connection procedure) and the WLAN AP then indicates this to the 3GPP RAN. The benefit of the generic identity is that it can be terminal-specific and yet be applicable regardless of the wireless terminal's state in 3GPP, which for example the C-RNTI may not be since the C-RNTI, even though being terminal-specific in a 3GPP cell, is released when the wireless terminal moves from CONNECTED to IDLE mode and hence is not applicable in IDLE mode.

2. Network Identity

In some embodiments, the WLAN AP may include an identity relevant for the WLAN network in the report. In case the 3GPP RAN node is not already aware of where the report comes from, i.e., from which WLAN AP the report comes, then including the WLAN network identity could help the 3GPP RAN to know from which WLAN AP the report comes and hence to which WLAN AP the wireless terminal has connected.

The WLAN may also provide to the 3GPP RAN node an indication of which PLMN and/or 3GPP cell a wireless terminal is associated with, in some embodiments. This can be useful in case the WLAN node provides information relevant for all wireless terminals which has connected to the WLAN, i.e., if the WLAN is not filtering out and reporting to a 3GPP RAN node information relevant to the wireless terminals associated with the specific RAN node. In that case the 3GPP RAN node may need to filter out the wireless terminals which are associated to it. Consider, for example, that the WLAN node sends the same information to all 3GPP RAN nodes, i.e., information relevant for all wireless terminals which are connected to the WLAN node, then the 3GPP RAN node may only be interested in information relevant for the wireless terminals which are associated with the 3GPP RAN node itself, but not interested in information relevant to terminals which are associated to other 3GPP RAN nodes, therefore by indicating to the 3GPP RAN node the PLMN and/or 3GPP cell a wireless terminal is associated with will allow the 3GPP RAN node to do the filtering.

3. Time of Connection

The report may include a time for when the wireless terminal connected. This is beneficial in the event that the report is sent some time after the terminal has connected. The reported time may be in the form of an absolute time (e.g. 13:41:17).

4. Type of Connection

The WLAN AP may, in some embodiments, indicate to the 3GPP RAN which type of connection the wireless terminal has connected with. The wireless terminal may connect to a WLAN AP using, e.g., S2a/S2b/S2b connections or a non-seamless WLAN offload (NSWO) connection. This information may valuable for the 3GPP RAN to know, as it allows the 3GPP RAN to determine what would be the effect of steering the terminal back to 3GPP. For example, it may be possible to steer a wireless terminal from WLAN to 3GPP with an S2a connection without creating interruptions in the wireless terminal's connection. However if a NSWO connection is steered, the wireless terminal may need to change IP-address with an interruption as consequence.

5. Connection Status

As noted above, a "connection" to WLAN can mean any of several different things, such as that authentication has been performed, data traffic has started flowing, etc. Thus, the WLAN AP may include an optional field indicating what type of "connection" the user has performed. This additional info is mainly useful for handling abnormal cases where the offloading was not completed properly.

It will be appreciated, in view of the several techniques described above, that certain modifications to UE behavior may be necessary or desired, to facilitate these techniques. For example, in order for the WLAN to transmit several of the reports described above to the 3GPP RAN node, the WLAN may in some implementations need to know to which 3GPP cell the UE is associated. Accordingly, in some embodiments, the UE is adapted to report the 3GPP cell identity (e.g., the E-CGI) to the WLAN, e.g., during any steps of WLAN association/authentication.

Likewise, in order for the 3GPP node to be able to identify which UE the report is associated with, wireless terminal identities should be in the report and recognizable at the 3GPP RAN node. Thus, in some embodiments, the UE sends its 3GPP identity and any other relevant information (such as PLMN, 3GPP cell ID, etc.) to the WLAN during any steps of the authentication/association procedures. The report described earlier would contain this identity and the 3GPP RAN node is capable of identifying which UE is transmitting to the WLAN AP sending the report.

In other embodiments, the UE reports its WLAN identity (e.g., a WLAN MAC address) during any steps of the radio connection setup in 3GPP, and the 3GPP RAN node is then able to associate the WLAN identity with the UE context. In that case the report from WLAN to 3GPP RAN node could contain the WLAN MAC address (available in the AP after WLAN association, after which the 3GPP RAN node can retrieve the UE context and identity the UE that is transmitting over WLAN.

In still other embodiments, a common identity is reported on both systems and associated to the UE context in 3GPP so that when the report from WLAN to 3GPP RAN node is received, the eNB is capable of retrieving the UE context and identify the UE.

Figure 10:
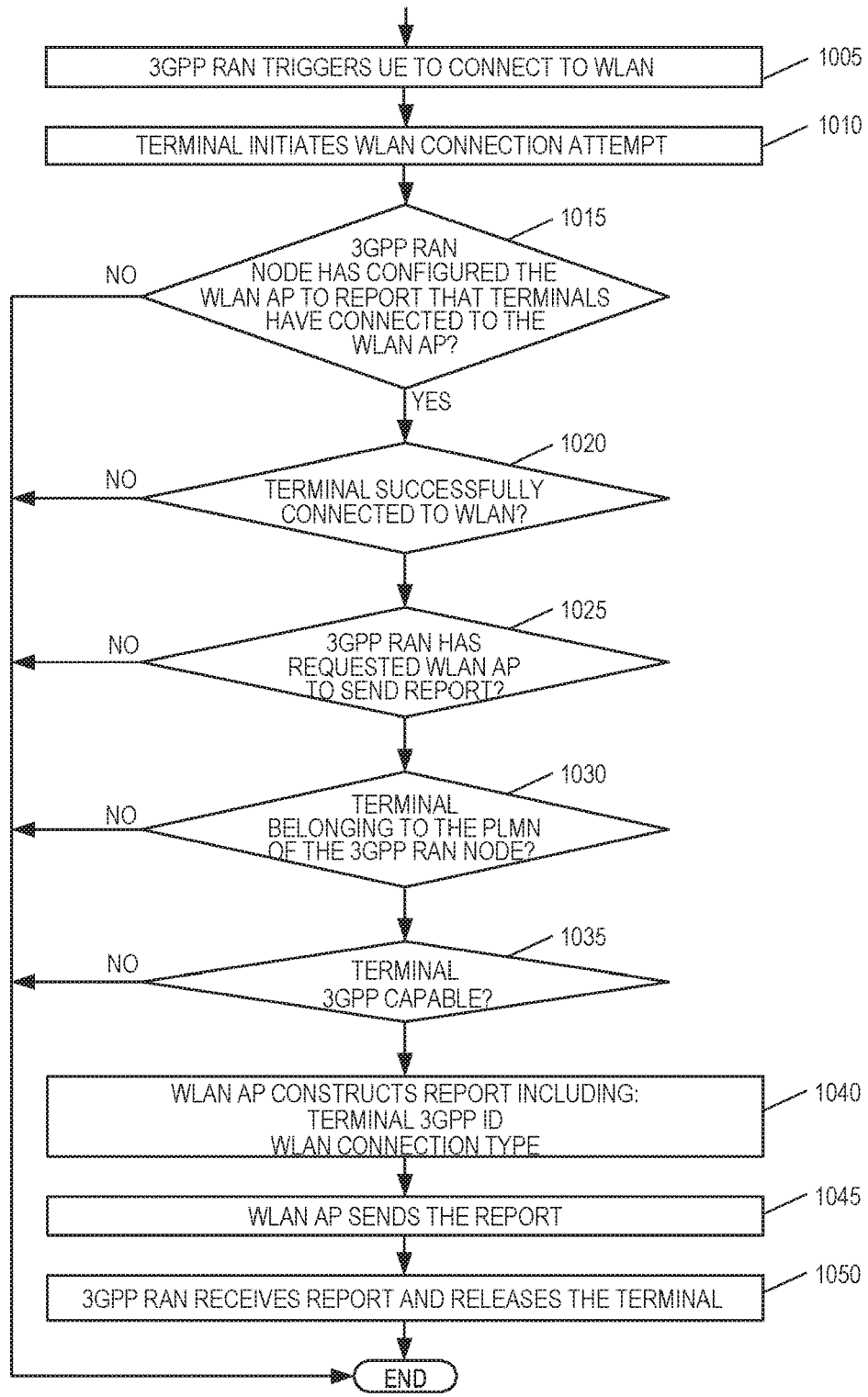
FIG. 10 is a process flow diagram illustrating several of the techniques described herein.

FIG. 10 is a flow diagram showing one example implementation of the techniques, where several of the mechanisms described herein are used. As seen at block 1005, a 3GPP RAN triggers a UE to connect to a WLAN. In response, the wireless terminal initiates a WLAN connection attempt, as shown at block 1010. Skipping ahead to block 1040, it can be seen that a WLAN AP constructs a report, including a 3GPP ID for the wireless terminal and a WLAN connection type. As seen at block 1045, the report is sent to the 3GPP network. A 3GPP network node receives the report, as shown at block 1050, and releases the terminal.

The sending of the report shown in block 1045 is conditioned, in the process shown in FIG. 10, on several factors. First, as shown at block 1015, the WLAN AP only sends reports if the 3GPP RAN node has configured the WLAN AP to report connections to the WLAN AP. As seen at block 1020, a report is only sent, in the illustrated technique, if a terminal has successfully connected to the WLAN. Next, as shown at block 1025, the WLAN AP in the illustrated process flow only sends a report in response to an explicit request from the 3GPP RAN. Further, as seen at block 1030, the report of a particular wireless terminal is sent only if the wireless terminal is associated with the 3GPP RAN node, i.e., belonging to the PLMN. Finally, the report for the wireless terminal is sent only if the wireless terminal is 3GPP capable, as shown at block 1035. It will be appreciated that any or all of the conditioning/filtering operations shown in the process flow of FIG. 10 may be omitted in some embodiments.

As can be seen from the detailed examples described above, in several embodiments of the techniques and apparatus described herein, a WLAN node indicates to a 3GPP network node that a terminal (or terminals) has connected to the WLAN AP, based on one or more of several different triggers. Further, in some embodiments, some conditions are provided, which allow the WLAN AP to omit from the report certain terminals that may not be of interest to the 3GPP network.

Figure 11:
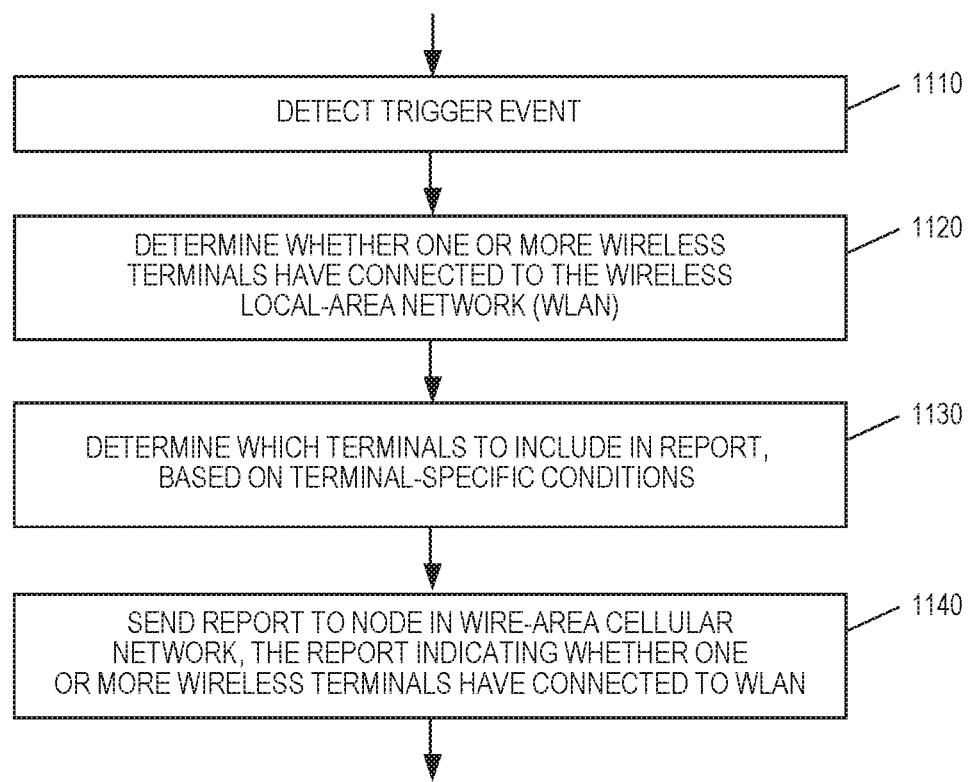
FIG. 11 is a process flow diagram illustrating an example method in a WLAN node.

Given the above detailed examples, it should be appreciated that these techniques may be applied more generally. For instance, FIG. 11 is a process flow diagram illustrating an example method, according to the above-described techniques, as implemented in a node of a WLAN, such as in a WLAN AP or WLAN AC.

As shown at block 1120, the method includes determining whether one or more wireless terminals have connected to the WLAN. As shown at block 1140, the method further includes sending a report to a node in a wide-area cellular network, the report indicating whether one or more wireless terminals have connected to the WLAN.

In some embodiments, the sending of the report is in response to detecting the occurrence of a trigger event. This is shown at block 1110 of FIG. 11, which is illustrated with a dashed outline to indicate that it need not appear in every embodiment of instance of the illustrated process flow. The trigger event may comprise one or more of the following, for example: completion of a connection procedure by one or by a predetermined number of wireless terminals; a request from the node in the cellular network; and expiration of a periodic reporting interval.

In some embodiments, the method further comprises determining whether or not each of one or more wireless terminals is included in the report based on one or more terminal-specific conditions. This is shown at block 1130, which is also illustrated with a dashed outline to indicate that it need not appear in every embodiment of instance of the illustrated process flow. These terminal-specific conditions may include one or more of the following, for example: whether the wireless terminal supports connectivity to the cellular network; a connection status to the cellular network for the wireless terminal; whether the wireless terminal has requested to be included in the report; a network identity corresponding to a cellular network to which the wireless terminal is connected; and a cause for the wireless terminal's connection to the WLAN.

In some embodiments, the report further indicates that one or more wireless terminals have unsuccessfully attempted to connect to the WLAN. In some of these and in other embodiments, the report contains one or more of the following: a terminal identity for each of one or more of the wireless terminals; an identifier for the WLAN and/or the node of the WLAN; a network identity corresponding to a cellular network to which the wireless terminal is connected, for each of one or more wireless terminals; a cellular network node identifier for a cellular network node with which the wireless terminal is associated, for each of one or more wireless terminals; a time of connection to the WLAN by the wireless terminal, for each of one or more wireless terminals; a type of connection to the WLAN by the wireless terminal, for each of one or more wireless terminals; and a WLAN connection status for the wireless terminal, for each of one or more wireless terminals.

Figure 12:
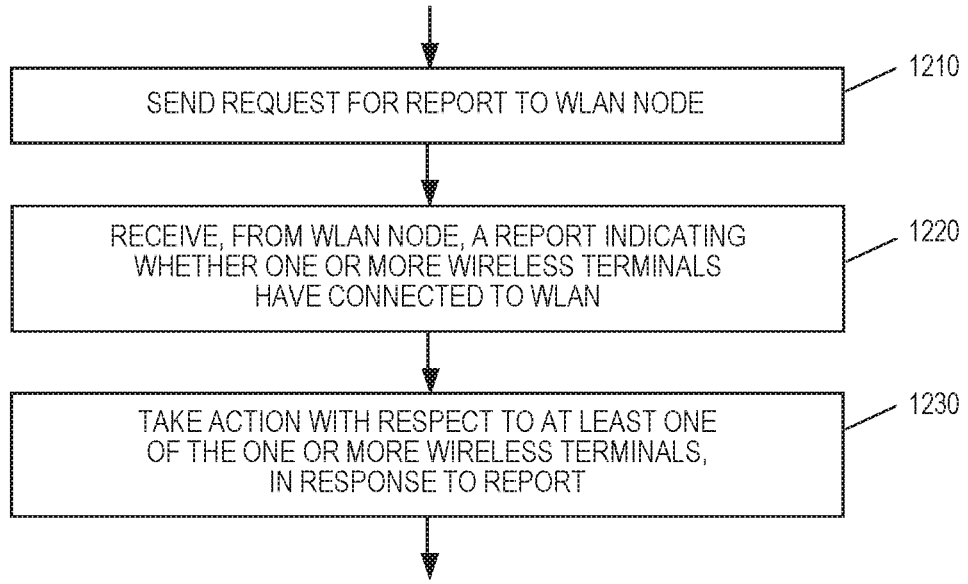
FIG. 12 is a process flow diagram illustrating an example method in a cellular network node.

Similarly, FIG. 12 is a process flow diagram illustrating an example method, according to the above-described techniques, as implemented in a node of a cellular network, such as in an LTE eNB. As shown at block 1220, the method includes receiving a report from a node in a wireless local-area network (WLAN), the report indicating whether one or more wireless terminals have connected to the WLAN. As shown at block 1230, the method further comprises taking action with respect to at least one of the one or more wireless terminals, in response to receiving the report.

In some embodiments or instances of the illustrated process flow, the receiving of the report is in response to an explicit request. Thus, as shown at block 1210, the illustrated process may include the sending of a request for the report to the WLAN node. Block 1210 is illustrated with a dashed outline to indicate that it need not appear in every embodiment of instance of the illustrated process flow.

In some embodiments, taking action with respect to one or more wireless terminals comprises releasing a connection between the node in the cellular network and the at least one of the one or more wireless terminals. In some embodiments, the report comprises a connection status to the WLAN, for the at least one of the one or more wireless terminals, and the releasing of the connection is conditioned on the connection status.

In some embodiments, the report further indicates that one or more wireless terminals has unsuccessfully attempted to connect to the WLAN, and the node in the cellular node refrains from attempts to offload one or more mobile terminals to the node in the WLAN.

In some embodiments, the report includes a cellular network node identifier for a cellular network node with which the wireless terminal is associated, for each of one or more wireless terminals. Taking action with respect to at least one of the one or more wireless terminals in these embodiments may comprise taking action only for those of the one or more wireless terminals associated with the node of the cellular network.

Figure 13:
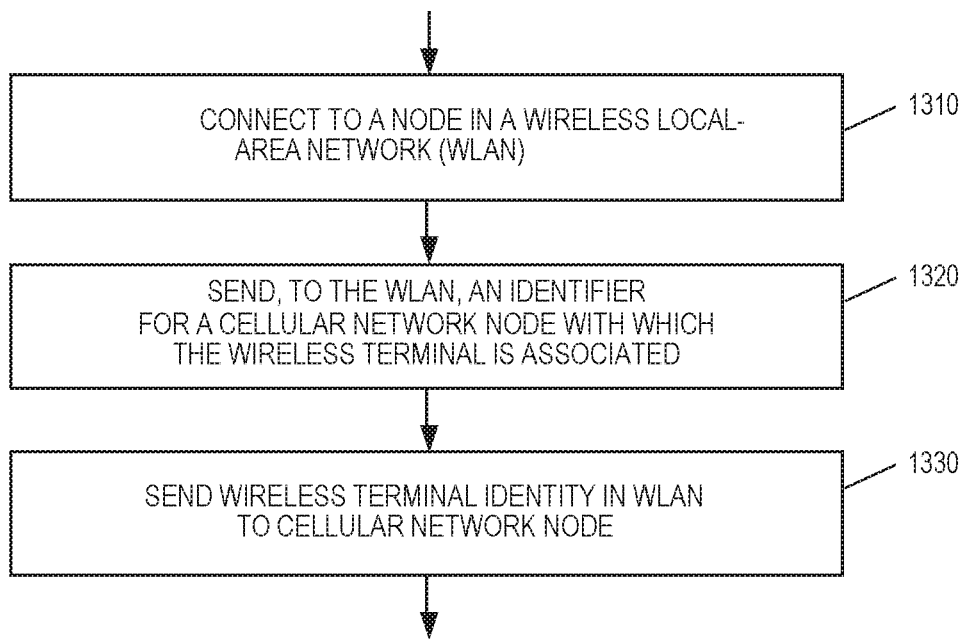
FIG. 13 is a process flow diagram illustrating an example method in a wireless terminal.

FIG. 13 is yet another process flow diagram, this time illustrating an example method as carried out by a wireless terminal, where the wireless terminal is adapted to operate in both a WLAN and a cellular network. As shown at block 1310, the method includes connecting to a node in a wireless local-area network (WLAN), where "connecting" can include any of the meanings discussed above. As shown at block 1320, the method further includes sending, to the WLAN, an identifier for a cellular network node with which the wireless terminal is associated or for a cellular network with which the wireless terminal is associated, or both.

In some embodiments, the method further includes sending an identifier for the wireless terminal to the WLAN. In some embodiments, the method includes sending an identity used by the wireless terminal in the WLAN to a cellular network node with which the wireless is associated. This is shown at block 1330, which is illustrated with a dashed outline to indicate that it need not appear in every embodiment of instance of the illustrated process flow.

As noted above, embodiments of the present invention include apparatus configured to carry out one or more of the techniques described herein, including the process flow diagrams of FIGS. 10-13. These apparatus include wireless terminal devices, cellular network nodes, and WLAN nodes, which in some embodiments may have configurations similar to those illustrated in FIGS. 7-9, each of which illustrates a device that includes a processing circuit comprising one or more processing elements and a memory circuit storing computer program instructions for execution by the processing circuit to carry out one or more of the methods disclosed herein.

It will be appreciated that these and similar devices may be understood as comprising one or more functional modules or units, where each functional module is configured, for example, to carry out one or more of the operations illustrated in the process flow diagrams of FIG. 10-13 or similar operations. Any one or more of these functional modules may be implemented with one or more processing circuits like those illustrated in FIGS. 7-9, for example.

Figure 14:
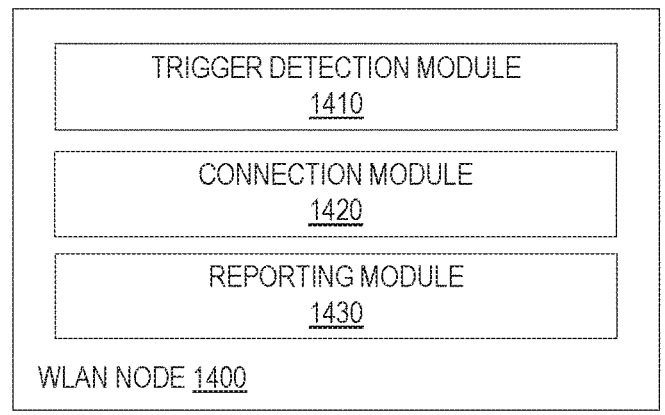
FIG. 14 is a block diagram illustrating a functional view of an example node in a WLAN.

FIG. 14 thus depicts a WLAN node 1400, including several such functional modules. More particularly, WLAN node 1400 includes a connection module 1420 for determining whether one or more wireless terminals have connected to the WLAN, and a reporting module 1430 for sending a report to a node in a wide-area cellular network, the report indicating whether one or more wireless terminals have connected to the WLAN. As noted above, the sending of the report may be in response to detecting the occurrence of a trigger event. Thus, the WLAN node 1400 shown in FIG. 14 further includes a trigger detection module 1410 for detecting the occurrence of the trigger event. It will be understood that the several variations of the techniques described above for implementation in a WLAN node apply equally to the WLAN node 1400 shown in FIG. 14.

Figure 15:
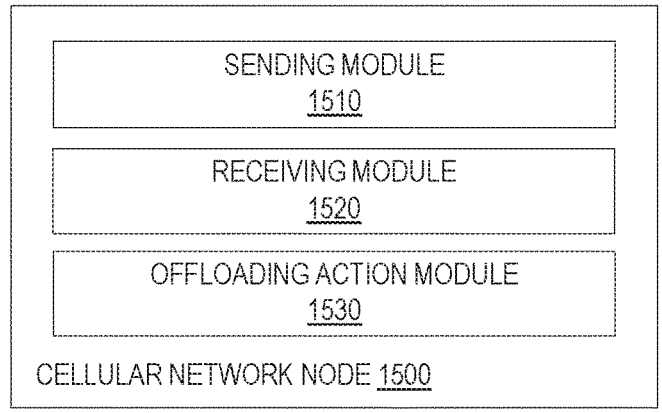
FIG. 15 is a block diagram illustrating a functional view of an example cellular network node.

Similarly, FIG. 15 illustrates a cellular network node 1500 comprising several functional modules, including a receiving module 1520 for receiving a report from a node in a WLAN, the report indicating whether one or more wireless terminals have connected to the WLAN. Cellular network node 1500 further includes an offloading action module 1530 for taking action with respect to at least one of the one or more wireless terminals, in response to receiving the report. This action may comprise any one or more of the actions described above, such as initiating an offload of a wireless terminal to a WLAN, or refraining from doing so. As noted above, the receiving of the report may be in response to an explicit request. The cellular network node 1500 thus includes a sending module 1510 for sending a request for the report to the WLAN node. Again, the several variations of the techniques described above for implementation in a cellular network node apply to the functional representation shown in FIG. 15.

Figure 16:
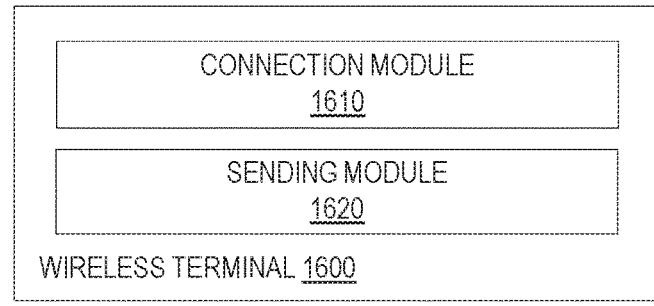
FIG. 16 is a block diagram illustrating a functional view of an example wireless terminal.

FIG. 16 is a functional representation of a wireless terminal 1600, which includes a connection module 1610 for connecting to a node in a WLAN, and a sending module 1620 for sending, to the WLAN, an identifier for a cellular network node with which the wireless terminal is associated or for a cellular network with which the wireless terminal is associated, or both. Once more, the several variations of the techniques described above for implementation in a wireless terminal apply to the functional representation shown in FIG. 16.

It will be appreciated by the person of skill in the art that various modifications may be made to the above described embodiments without departing from the scope of the present invention. For example, although embodiments of the present invention have been described with examples that reference a communication system compliant to the 3GPP-specified LTE standards, it should be noted that the solutions presented may be equally well applicable to other networks. The specific embodiments described above should therefore be considered exemplary rather than limiting the scope of the invention. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

In the present description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments have been described herein, with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) running on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure, and shall not be restricted or limited by the foregoing detailed description.

What is claimed is:

1. A method, in a network node of a wide-area cellular network, the method comprising:
   receiving a report from a network node in a wireless local-area network (WLAN), the report indicating whether one or more wireless terminals have connected to the WLAN; and
   taking action with respect to at least one of the one or more wireless terminals, in response to receiving the report, wherein said taking action comprises releasing a connection between the network node in the cellular network and the at least one of the one or more wireless terminals;
   wherein the report indicates that one or more wireless terminals has unsuccessfully attempted to connect to the WLAN, and wherein the method further comprises refraining from attempts to offload the one or more mobile terminals to the network node in the WLAN.

2. The method of claim 1, further comprising sending a request for the report to the network node in the WLAN, wherein said receiving the report is in response to the request.

3. The method of claim 1, wherein the report comprises a cellular network node identifier for a cellular network node with which the wireless terminal is associated, for each of one or more wireless terminals, and wherein taking action with respect to at least one of the one or more wireless terminals comprises taking action only for those of the one or more wireless terminals associated with the node of the cellular network.

4. A cellular network node apparatus for use in a cellular network, the apparatus comprising processing circuitry configured to:
   receive a report from a network node in a wireless local-area network (WLAN), the report indicating whether one or more wireless terminals have connected to the WLAN; and
   take action with respect to at least one of the one or more wireless terminals, in response to receiving the report, wherein said action comprises releasing a connection between the network node in the cellular network and the at least one of the one or more wireless terminals, and wherein said action further comprises refraining from attempts to offload the one or more mobile terminals to the network node in the WLAN in response to receiving a report indicating that one or more wireless terminals has unsuccessfully attempted to connect to the WLAN.

5. The cellular network node apparatus of claim 4, wherein the processing circuitry is further configured to send a request for the report to the network node in the WLAN, wherein said receiving the report is in response to the request.

6. The cellular network node apparatus of claim 4, wherein the report comprises a cellular network node identifier for a cellular network node with which the wireless terminal is associated, for each of one or more wireless terminals, and wherein said action with respect to at least one of the one or more wireless terminals comprises taking action only for those of the one or more wireless terminals associated with the node of the cellular network.

* * * * *